Feb. 5, 1952 J. A. PIERCE ET AL 2,584,286
PREPARATION AND DRYING OF CATALYTIC HYDROGEL BEADS
Filed March 11, 1944
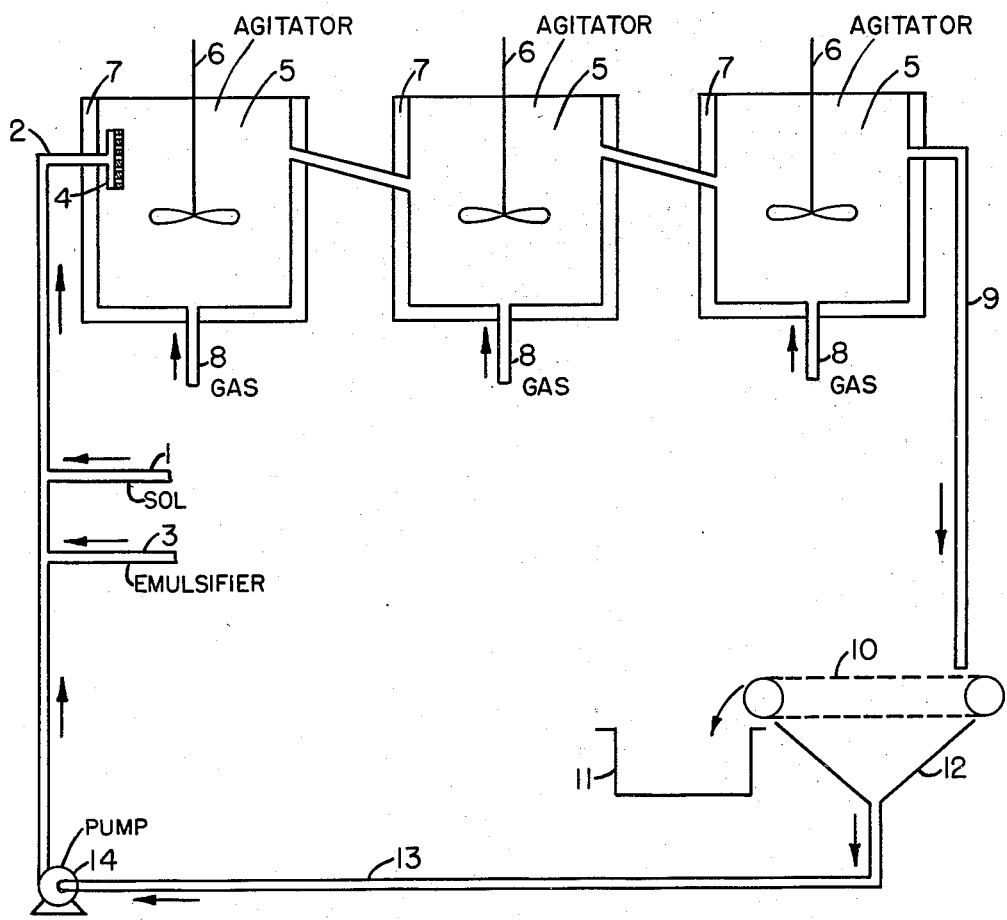
Jerry A. Pierce
Charles N. Kimberlin Jr. INVENTORS
BY _____ ATTORNEY

Patented Feb. 5, 1952

2,584,286

UNITED STATES PATENT OFFICE 2,584,286

PREPARATION AND DRYING OF CATALYTIC HYDROGEL BEADS

Jerry A. Pierce and Charles N. Kimberlin, Jr., Baton Rouge, La., assignors to Standard Oil Development Company, a corporation of Delaware Application March 11, 1944, Serial No. 526,048

10 Claims. (Cl. 252—448)

This invention relates to the art of preparing adsorbent gels in spherical form and it relates more particularly to the preparation of spherical gels having diameters up to about 1 mm.

Inorganic gels are well known and have long been used for various purposes; for example for the adsorption of condensible vapors from gaseous carriers and for catalytic purposes either as the catalyst itself or as a component thereof or as a carrier. Simple gels may be used alone or after impregnation with catalytic materials, or if desired plural gels such as silica-alumina gels may be used. The present invention deals with the preparation of such gels which can be used for any of the above mentioned purposes either as simple gels or as plural gels. The present method is capable of producing gel particles in uniform spherical shapes having diameters up to 1 mm. which have particularly desirable industrial uses and have many advantages over the irregularly shaped particles ordinarily produced by grinding larger gel aggregates.

The gels produced according to this invention have been found to be particularly useful as catalysts for carrying out reactions involving hydrocarbons and particularly in the so-called fluid catalyst process in which the catalyst is in powdered form and is aerated or fluidized by means of a gas so that it acquires the properties of a liquid such as fluid flow and hydrostatic pressure. It has recently been found that catalysts having a particle size particularly suitable for the fluid catalyst process; that is between 20 and 500 microns can be prepared by causing a sol of the desired gel-forming substance to set while dispersed in a water-immiscible liquid such as oil or in suspension between two liquids one more dense, the other less dense than the sol, such as lubricating oil floating on ethylenedichloride. It is usually desirable to wash the resulting spheres of hydrogel prior to impregnating and drying. This is made so by the presence of contaminating amounts of salts which are produced during the preparation of the sol. However, there are some types of sols which can be prepared easily without the formation of these contaminating salts, in which case the washing step can be eliminated and the hydrogel can be immediately dried as soon as it is formed.

It is therefore an object of this invention to prepare and dry hydrogels in one step without an intermediate washing step. Gels which can be prepared in this manner include the oxides of aluminum, titanium, iron, tungsten, nickel, cobalt, etc., and the mixtures such as alumina-boria, alumina-chromia, alumina-molybdena, etc. Silica sol is one of the most common types of sols in which salts are produced as impurities during the formation of the sol. Therefore the present invention is not particularly suited to the preparation of silica gel ready for use unless it is desired to use the silica for purposes in which the presence of the occluded salts is of no disadvantage. In such a case, any type of gel can be prepared according to the present invention.

This and other objects of the invention are attained by dispersing a sol of the desired gel-forming substance in a water-immiscible liquid which is maintained at a temperature at which the water is removed from the sol to such an extent that gelation occurs.

The invention has particular application to the preparation of alumina gels but is equally applicable to the formation of other types of gels as pointed out above. The setting of an alumina sol is very difficult to control. A concentrated alumina sol may set when chilled but cannot be depended upon to do so. A dilute alumina sol may set spontaneously at the end of several months but there is no way of determining the exact length of time which this will take to any degree of certainty. The addition of a base will set either the dilute or the concentrated sol quickly but the time is too short for the sol thus treated to be used in making spheres except under carefully controlled conditions. However the sol can be concentrated by dispersing it in a water-immiscible liquid and heating the liquid so as to cause the water to distill slowly from the sol. In this manner, firm spheres of alumina hydrogel are formed which may be removed and further dried in the usual manner or the process may be continued until the particles contain less than 50% water whereupon they become hard and sandy.

Water-immiscible liquids, particularly suitable for this invention, are naphtha, kerosene, mineral seal oil, lubricating oil, gas oil and the like. Other suitable water-immiscible liquids include ethylene dichloride, acetylene tetrabromide, nitrobenzene and any other organic liquid which is immiscible with water and does not have any injurious effect on the gel.

The dispersion is preferably accomplished by emulsifying the sol in the dispersing medium, either by mechanical agitation or by mechanical agitation plus an emulsifying agent.

The manner in which the process of this invention may be carried out will be fully understood from the following description when read with reference to the accompanying drawing, which is a diagrammatic view in sectional elevation of one type of suitable apparatus.

Referring to the drawing, an alumina sol is introduced through line 1 into a stream of oil or other water-immiscible liquid flowing in line 2 and containing an emulsifier introduced through line 3. Although the liquid flowing in line 2 may be any water-immiscible liquid it will be considered for the purposes of this description as an oil. The ratio of oil to sol is maintained above about 8 to 1 in order to maintain the sol in the dispersed phase. The emulsion of alumina sol in oil is sprayed through distributor 4 into the first of a series of open agitators 5. Any number of agitators may be used but for simplification only three are shown. The contents of the agitators are maintained turbulent by means of stirrers 6.

It is known that the temperature of the dispersing medium determines the time in which a sol will set. For example the rate at which silica sol sets increases with temperature. On the other hand alumina sol sets quicker for a given concentration at lower temperatures. However, as pointed out above the setting is difficult to control even at these temperatures. It has now been found that the setting of alumina sols as well as other similar types of sols can be controlled by concentrating the sols to such an extent that they can no longer remain in the sol state but are converted to the hydrogel. This is accomplished according to the present invention by maintaining agitators 5 at a temperature of 150–200° F. by means of steam jackets 7 and moving the alumina sol through the agitators at such a rate that the sol is converted into a hydrogel and removed from the last agitator in the series as firm, spherical particles. Generally a residence time of about 2 hours is sufficient to remove about 50% of the water from the hydrogel. However, this residence time may be decreased considerably by introducing inert gases such as air, nitrogen, or carbon dioxide into each agitator through lines 8, or by the application of reduced pressure. Each of the agitators 5 are preferably kept open at the top so as to allow the gas and entrained water vapor to escape.

The emulsion of oil and hydrogel spheres are allowed to overflow from one agitator to the other and are finally removed from the last agitator through line 9. The mixture is then introduced onto moving belt filter 10 to separate the spheres from the oil. These spheres are discharged from the belt into storage hopper 11 while the oil is collected in funnel 12 and passed through line 13 to pump 14 from which it is recycled to line 2.

It will be understood of course that the process of the present invention may be widely varied and that while the continuous process illustrated above is probably the cheapest and most desirable for large scale production, batch methods can also be employed and are within the scope of the present invention.

The following example will illustrate the advantages of the present invention:

To 1600 cc. of mineral seal oil was added 5 drops of Aerosol supplied by Eimer and Amend. This was heated to a temperature of 165° F. and kept in agitation while 100 cc. of 5% alumina sol was added. Agitation and heating were continued for 3 hours and it was then found that the particles had been dehydrated to the point where they felt gritty when rubbed between the fingers. The resulting slurry was then cooled to 75° F. whereupon the solid particles settled into a cake which could be easily separated from the oil.

While the above description has been directed to the formation and drying of alumina hydrogels it is to be understood also that the invention is not to be limited thereto but is applicable to the formation and drying of all types of hydrogels.

The emulsification of the sol and the oil can be effected merely by agitation but the use of an emulsifier is of considerable assistance. Suitable emulsifying agents include soaps, alkaline salts of higher olefin or higher alkyl sulfates such as sodium lauryl sulfate etc. The sulfonates and various specially prepared commercial emulsifiers are also useful as well as any other emulsifier which will cause the formation of water-in-oil type emulsions.

The size of the hydrogel particles can be controlled by the degree of dispersion since they will correspond to the size of the emulsified droplets of the sol and any means for regulating the degree of dispersion will have this effect. The principal factor for regulating the degree of dispersion is the violence of agitation during emulsification in the agitator. Other factors include the nature of the water-immiscible liquid used and the emulsifying agent. By balancing all of these factors the size of the particles can be controlled with considerable degree of accuracy.

The materials prepared according to the present invention resemble fine sand and are of a spherical or spheroidal shape with few if any irregular shaped particles being present.

The products prepared according to this invention are particularly useful in the fluid catalyst process since they can be made within the desired size range of between 20 to 500 microns in diameter found to be especially suitable for this process. For example the spherical particles formed according to this invention with or without the addition of other substances are suitable as catalysts for cracking of hydrogenation, dehydrogenation, desulfurization, isomerization, and alkylation of hydrocarbons, the reforming of naphthas, and the hydrogenation of the oxides of carbon, etc.

The nature and objects of the present invention having thus been set forth and a detailed description of the same given what is claimed as new and useful and desired to be secured by Letters Patents is:

1. A continuous process for preparing dry adsorbent alumina gel in spherical form comprising emulsifying alumina sol in mineral oil, maintaining said emulsion at a temperature between 150 and 200° F. for a period of time sufficient to cause said sol to set to a hydrogel, maintaining said hydrogel dispersed in said oil for a further period of time at the same temperature to distill the water therefrom and form dry hard spherical particles of alumina gel, passing an inert gas through the oil containing the dispersed hydrogel particles to assist in removing water from the hydrogel particles, separating said alumina gel particles from said oil and returning said oil to said emulsifying step.

2. A continuous process for preparing dry adsorbent alumina gel in spherical form comprising emulsifying alumina sol in mineral oil, maintaining said emulsion at a temperature between 150 and 200° F. for a period of time sufficient to cause said sol to set to a hydrogel, maintaining said hydrogel dispersed in said oil for a further period of time at the same temperature to distill the water therefrom and form dry hard spherical particles of alumina gel, maintaining the oil containing the dispersed hydrogel particles under reduced pressure to aid in removing water from the hydrogel particles, separating the alumina gel particles from said oil and returning said oil to said emulsifying step.

3. A process for preparing dry adsorbent alumina gel in spherical form which comprises emulsifying an alumina sol in mineral oil, maintaining the temperature of the emulsion between about 150° and 200° F. so as to remove sufficient water from said sol particles to cause said sol particles to set to hydrogel particles, then maintaining said hydrogel particles dispersed in said oil for an additional period of time at a temperature between about 150° and 200° F. sufficient to remove at least 50% of the water from the gel particles and to produce hard spherical gel particles, and removing the alumina gel particles from said oil.

4. A continuous process for preparing dry adsorbent alumina gel in spherical form which comprises emulsifying alumina sol in mineral oil, maintaining the emulsion at a temperature between about 150° F. and 200° F. for a period of time sufficient to cause said sol particles to set to hydrogel particles, maintaining the hydrogel particles dispersed in said oil for a further period of time at a temperature between about 150° and 200° F. to distill about 50% of the water from the hydrogel particles and to form dry, gritty hard spherical particles of alumina gel, separating said alumina gel particles from said oil and returning said oil to said emulsifying step.

5. A process for preparing dry, adsorbent alumina-boria gel in spherical form which comprises emulsifying an alumina-boria plural sol in mineral oil, maintaining the temperature of the emulsion between about 150° F. and 200° F. so as to remove sufficient water from said plural sol particles to cause said sol particles to set to hydrogel particles, maintaining said hydrogel particles dispersed in said oil for an additional period of time at a temperature between about 150° and 200° F. sufficient to remove at least 50% of the water from the hydrogel particles and to produce hard gritty spherical gel particles and removing the hard and gritty alumina-boria gel particles from the oil.

6. A process for preparing adsorbent inorganic gels in spherical form which comprises emulsifying a sol of the desired inorganic gel-forming substance in the form of minute droplets in a water-immiscible liquid, maintaining said emulsion at a temperature between about 150° F. and 200° F. to cause conversion of the sol particles to hydrogel particles, maintaining said hydrogel particles dispersed in said liquid at a temperature between about 150° F. and 200° F. for an additional period of time sufficient to remove at least 50% of the water from the hydrogel particles and to convert said hydrogel particles into hard and gritty gel spheres and removing the hard and gritty gel spheres from said liquid.

7. The process of drying inorganic oxide gels in the form of small discrete spheroidal particles which comprises dispersing in a water-immiscible hydrocarbon liquid spheroidal particles of a hydrogel having a strong agglomerating tendency, maintaining said dispersion at an elevated temperature at which water exerts a substantial vapor pressure, removing water vapor from the dispersion by injecting a desiccating gas therethrough thereby reducing the water content of the suspended gel particles to a point where agglomeration ceases, and thereafter separating the gel particles from the hydrocarbon liquid.

8. The process of drying inorganic oxide gels in the form of small discrete spheroidal particles which comprises dispersing in a water-immiscible hydrocarbon liquid spheroidal particles of a hydrogel, maintaining said dispersion at an elevated temperature at which water exerts a substantial vapor pressure, removing water vapor from the dispersion by injecting a desiccating gas therethrough thereby reducing the water content of the suspended gel particles, and thereafter separating the gel particles from the hydrocarbon liquid.

9. The process of claim 7 wherein the hydrocarbon liquid employed is a naphtha.

10. The process of claim 7 wherein the temperature of the dispersion is maintained at about 150°–200° F.

JERRY A. PIERCE.
CHARLES N. KIMBERLIN, Jr.

REFERENCES CITED

The following references are of record in the file of this patent:

UNITED STATES PATENTS

| Number | Name | Date |
|---|---|---|
| 1,195,099 | Salm | Aug. 15, 1916 |
| 1,297,724 | Patrick | Mar. 18, 1919 |
| 1,614,636 | Wachtel | Jan. 18, 1927 |
| 2,102,849 | Kokatnur | Dec. 21, 1937 |
| 2,284,248 | Baker et al. | May 26, 1942 |
| 2,385,217 | Marisic | Sept. 18, 1945 |
| 2,390,556 | Ruthruff | Dec. 11, 1945 |
| 2,418,232 | Marisic | Apr. 1, 1947 |
| 2,435,379 | Archibald | Feb. 3, 1948 |

FOREIGN PATENTS

| Number | Country | Date |
|---|---|---|
| 15,365 | Great Britain | July 6, 1916 |
| 100,073 | Great Britain | Feb. 12, 1917 |
| 222,279 | Great Britain | Oct. 2, 1924 |